(12) United States Patent
Foster

(10) Patent No.: US 12,326,132 B2
(45) Date of Patent: Jun. 10, 2025

(54) WAVE ENERGY CAPTURING DEVICE

(71) Applicant: MARINE POWER SYSTEMS LIMITED, Swansea (GB)

(72) Inventor: Graham Foster, Swansea (GB)

(73) Assignee: MARINE POWER SYSTEMS LIMITED, Swansea (GB)

( * ) Notice: Subject to any disclaimer, the term of this patent is extended or adjusted under 35 U.S.C. 154(b) by 0 days.

(21) Appl. No.: 18/539,680

(22) Filed: Dec. 14, 2023

(65) Prior Publication Data

US 2024/0110540 A1 Apr. 4, 2024

Related U.S. Application Data

(63) Continuation of application No. PCT/EP2022/067355, filed on Jun. 24, 2022.

(30) Foreign Application Priority Data

Jun. 25, 2021 (GB) ........................... 2109183
Nov. 24, 2021 (GB) ........................... 2116953

(51) Int. Cl.
*F03B 13/18* (2006.01)
*F03B 13/20* (2006.01)

(52) U.S. Cl.
CPC .......... *F03B 13/1815* (2013.01); *F03B 13/20* (2013.01); *F05B 2240/93* (2013.01);
(Continued)

(58) Field of Classification Search
CPC ........ F03B 13/26; F03B 13/16; F03B 13/188; F03B 13/1885; F03B 13/20; F03B 15/00;
(Continued)

(56) References Cited

U.S. PATENT DOCUMENTS

2007/0108773 A1* 5/2007 Resen Steenstrup ........................ F03B 13/1815 290/53
2011/0068579 A1* 3/2011 Dullaway ............... F03B 13/20 290/53

(Continued)

FOREIGN PATENT DOCUMENTS

DE 19612124 10/1997
DE 19612127 A1 * 10/1997 ............. B29C 65/00
(Continued)

OTHER PUBLICATIONS

English Translation FR-3021291-A1 (Year: 2015).*
(Continued)

*Primary Examiner* — Shafiq Mian
(74) *Attorney, Agent, or Firm* — Heslin Rothenberg Farley & Mesiti P.C.

(57) ABSTRACT

A wave energy capturing device arranged to capture and convert wave energy to useful energy when positioned in an operating mode. The device includes a pivot point and a buoyant wave energy absorber affixed to the pivot point. The device has an operating mode where the device is arranged to capture wave energy. In the operating mode the pivot point is supported above the surface of a body of water and is held substantially stationary relative to wave movement. The buoyant absorber is engaged with the surface of the body of water at an operating location positioned downwave of the pivot point and wherein the absorber is arranged to rotate about the pivot point. The rotation defining a rotation arc of the absorber along which the absorber is arranged to reciprocate in the operating mode. The disclosure aims to provide improved capture of wave energy for conversion to useful energy.

26 Claims, 10 Drawing Sheets

(52) U.S. Cl.
    CPC ... *F05B 2270/1077* (2020.08); *F05B 2270/18* (2013.01); *F05B 2270/202* (2020.08)

(58) Field of Classification Search
    CPC .......... F05B 2240/93; F05B 2260/4031; F05B 2220/706; F05B 2240/97; F05B 2280/5001; Y02E 10/38
    See application file for complete search history.

(56) References Cited

U.S. PATENT DOCUMENTS

| | | | |
|---|---|---|---|
| 2014/0091576 A1* | 4/2014 | Wille | F03D 9/255 290/53 |
| 2020/0240388 A1* | 7/2020 | Dragic | F03B 13/1845 |

FOREIGN PATENT DOCUMENTS

| | | | |
|---|---|---|---|
| EP | 2546511 | 1/2013 | |
| FR | 3021291 | 11/2015 | |
| FR | 3021291 A1 * | 11/2015 | .......... F03B 13/1815 |
| WO | 2005038246 | 4/2005 | |
| WO | 2010080045 | 7/2010 | |

OTHER PUBLICATIONS

English Translation DE-19612127-A1 (Year: 1997).*
International Search Report and Written Opinion of the International Searching Authority for PCT/EP2022/067355, Oct. 21, 2022, 11 pages.

* cited by examiner

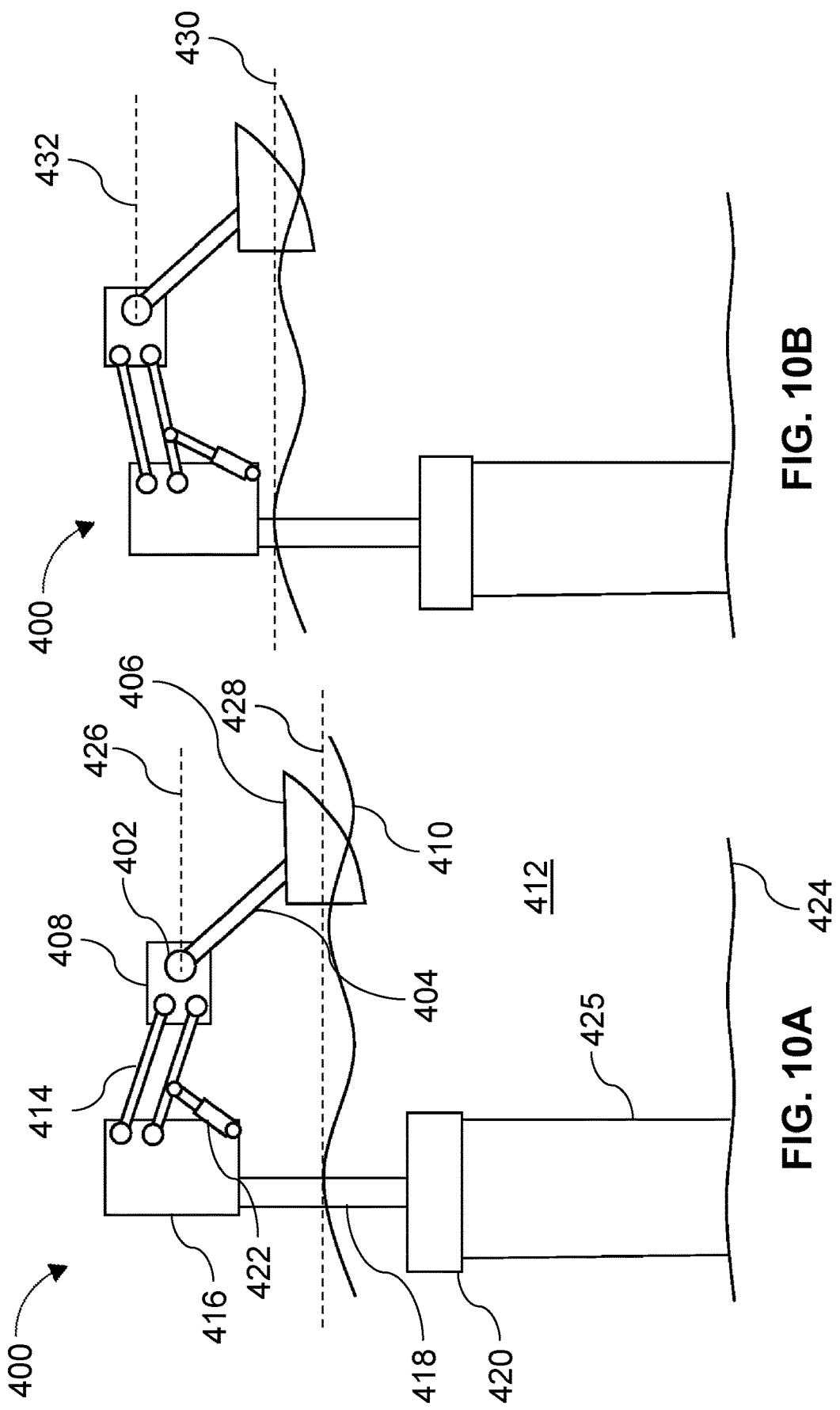

_US 12,326,132 B2_

WAVE ENERGY CAPTURING DEVICE

CROSS REFERENCE TO RELATED APPLICATIONS

This continuation application claims priority benefit from International Application No. PCT/EP2022/067355 filed on Jun. 24, 2022, which claimed priority from Great Britain Application No. 2109183.0 filed Jun. 25, 2021 and Great Britain Application No. 2116953.7 filed Nov. 24, 2021, which are all incorporated herein by reference in their entireties.

FIELD OF THE INVENTION

The present disclosure relates to a renewable energy capturing device, and in particular to a wave energy capturing device for use in the capture and conversion of wave energy to useful energy.

BACKGROUND OF THE INVENTION

Wave energy capture often involves the translation of movement of an object, moving as a result of wave movement, to the movement of an energy converter for conversion to a useful form of energy, such as electrical energy.

Common methods of capturing wave energy involve, for example, the movement of an oscillating flap, which often moves through an angular working stroke as a result of wave forces acting thereon. Such a design is often unable to maximize energy absorption from wave movement since upon impingement of wave forces on one side of the flap, the flap invariably propagates (radiates) a wave on the other side of the flap as it moves. Such a bidirectional flap is additionally incapable of maximizing energy capture from various directional forces resulting from wave movement.

Similar wave propagation problems are presented with forms of multidirectional wave energy capture devices such as, for example, an omnidirectional floating or submerged point absorber. Such an absorber is unable to move under the impetus of wave forces to capture energy thereof without, to some degree, radiating waves in all other directions, thereby unduly wasting a portion of energy captured.

Therefore, it is desirable to provide a wave energy capturing device with improved energy capture capability, specifically a device arranged to optimise capture of the available directional forces resulting from wave movement, preferably without a resulting wave propagation by the device.

SUMMARY OF THE INVENTION

The present disclosure is directed to a wave energy capturing device, and a buoyant offshore renewable energy capturing system for supporting a wave energy capturing device. The device comprises a buoyant wave energy absorber which is coupled to a pivot point, either: directly on or proximate the absorber body; or optionally by way of an arm member extending between the pivot point and the absorber body, the absorber and/or the arm member being rotatable about the pivot point. The device comprises an operational mode during which the device is arranged to capture wave energy for conversion by an energy converter to useful energy. In the operational, or in-use, mode, the absorber is positioned in engagement with the surface of a body of water above which the pivot point is supported. The position at which the absorber is in engagement with the body of water, termed herein as the "operating location", is located downwave of the pivot point. The term "downwave" will be understood by the skilled reader in the context of the present invention to mean "downstream of" in accordance with a wave direction. Specifically, the term "downwave of the pivot point" refers to a point along a wave propagation trajectory which is further than that vertically aligned with, or further than that vertically beneath, the pivot point. As such the absorber is positioned at rest, in the operating mode, having at least a majority of the absorber located on one side of the center of the pivot point, said side being further along a prevalent wave propagation trajectory than the center. In preferable embodiments, the absorber may be wholly positioned on one side of the center of the pivot point at rest in the operating mode. The term "at rest" in the context of the present invention will be understood by the skilled addressee to mean a sustained period in time while the absorber is not actively moving along the rotation arc, for example during a calm sea state with only minimal or no wave movement, or when the surface of the body of water is substantially flat. In such a configuration, in embodiments comprising an arm member, the arm member is positioned nonparallel to, or oblique relative to, a vertical plane occupied by the pivot point.

This positioning of the absorber in this manner, while rotatably coupled to the pivot point, optionally by way of an arm member, constrains the absorber, or a point located thereon, to movement along the rotation arc under impetus from wave movement within the body of water. In particular, said wave movement in a prevalent wave direction causes the absorber to reciprocate along the rotation arc, first upwards in the prevalent wave direction as the sea level increases in height by virtue of said wave movement, and subsequently back along the rotation arc as the sea level decreases following said wave movement. Thus, a reciprocating, angular motion of: the absorber; an imaginary straight line extending between the pivot point and an outer edge of the absorber distal to the pivot point; and/or an arm member affixed between the absorber and the pivot point, is caused by the interaction between the absorber and the waves. This reciprocation of the absorber along the rotation arc, and optional angular movement of: the absorber; the imaginary line extending between the pivot point and an outer edge of the absorber distal to the pivot point; and/or the arm member, allows the absorber to absorb wave energy from said waves of the body of water in both heave (vertical wave component) and surge (horizontal wave component) increasing the efficiency of the wave energy capture. Since waves of a body of water typically have a principal wave direction at a particular point in time, capture of these heave and surge components of the wave in this direction is preferably optimized by the present invention.

Therefore, in accordance with a first aspect of the present disclosure, there is provided a wave energy capturing device arranged to capture and convert wave energy to useful energy, the device comprising: a pivot point; and a buoyant wave energy absorber affixed to the pivot point; the device further comprising an operating mode in which the device is arranged to capture said wave energy, wherein in the operating mode: the pivot point is supported above a surface of a body of water and is held substantially stationary relative to wave movement in the body of water; the buoyant absorber is positioned in engagement with said surface of the body of water at an operating location positioned downwave of the pivot point; and wherein the absorber is arranged to rotate about the pivot point under impetus from said wave movement, said rotation defining a rotation arc of the absorber along which the absorber is arranged to reciprocate in the operating mode.

In preferable embodiments, the absorber comprises a wave-engaging surface, and a curved downwave surface; the curved downwave surface positioned downwave of the wave-engaging surface in the operating mode; and wherein at least a portion of the downwave surface comprises a curve extending from adjacent the wave-engaging surface substantially along a portion of the rotation arc.

The absorber is preferably shaped specifically to enhance the capture of energy from the waves. In preferable embodiments, the absorber is arranged to be oriented to face an average or prevailing wave direction. For example, in embodiments having a wave-engaging surface, the device is preferably arranged to the orient the wave-engaging surface to oppose said average or prevailing wave direction. In preferable embodiments therefore, the sectional shape of the absorber (in a plane parallel to the wave direction) is optimized to maximize wave energy capture.

At rest in the operating mode, when the surface of the body of water is substantially flat, the absorber is arranged to sit engaged with the surface of the body of water, partially submerged with a portion of the absorber underwater and a portion of the absorber above the water. When the absorber moves in the operating mode, as a result of wave movement, it is arranged to move under impetus from the waves, which may involve movement further into, and out of, the water. The manner in which the absorber moves in the water may have a significant bearing on the efficiency of the energy capture. The absorber is therefore preferably arranged to, when moving along the rotation arc, optionally defined by the arm member, provide resistance against approaching wave movement (to absorb energy thereof), and further preferably arranged so as to not, or only minimally, propagate a wave when moving through the rotation arc (which would otherwise thereby waste energy).

In order to optimize energy capture, the absorber preferably comprises at least one curved downwave surface, facing an opposite direction to the prevailing wave direction, and away from the pivot point in said direction, in the operating mode. In some preferable embodiments, the curve of the curved downwave surface substantially follows a portion of the rotation arc, such that the curved downwave surface is concentric with, or substantially concentric with, the rotation arc, the center thereof being substantially located at the pivot point in preferable such embodiments. By virtue of following, or substantially following, a portion of the rotation arc, the curved downwave surface is preferably arranged to pass through the body of water, when the absorber is moved under impetus from said wave movement, such that the curved downwave surface does not disturb or otherwise oppose the body of water, and therefore preferably does not propagate, or causes only minimal propagation of, a wave. Any such wave propagation by the curved downwave surface would otherwise waste wave energy captured by the absorber.

The curved downwave surface therefore preferably gives such embodiments of a wave energy capturing device a highly advantageous property: the device is able to absorb wave energy from a prevailing wave direction whilst minimising the propagation (radiation) of waves in any other direction, which would otherwise waste a significant proportion of the energy captured by the absorber.

Other wave energy capturing devices do not share this property. For example, a typical oscillating flap wave energy capturing device comprises a vertical flap which moves through an angular working stroke. This design is unable to absorb energy from waves approaching from one side of the flap without in some way propagating (radiating) a wave on the other side of the flap as it moves. Similarly, a typical omnidirectional point absorber is unable to absorb wave energy from a prevailing wave direction without to some degree radiating waves in all other directions, wasting energy.

The wave engaging surface is arranged to oppose wave movement in the body of water such that said wave movement provides an impetus to the movement of the absorber along the rotation arc. In preferable embodiments, the wave-engaging surface intersects the rotation arc. In such embodiments, the wave-engaging surface is unaligned with, and preferably oblique to, the rotation arc, which preferably provides optimal wave energy capture in a prevailing wave direction. The wave-engaging surface is preferably substantially flat. In preferable embodiments, the wave engaging surface is substantially perpendicular to the rotation arc such that when the absorber is at rest in the operating mode, the wave engaging surface is oriented vertically and substantially parallel to a vertical plane occupied by the pivot point.

In some embodiments, it may be desirable for the reciprocation, or oscillation, of the absorber along the rotation arc to be performed at a frequency of reciprocation or oscillation which is associated with a frequency of said waves, from which energy is to be absorbed. In particular embodiments, it may be preferable for said frequency of reciprocation or oscillation to be approximately that of, or equivalent to a said frequency of, the waves. Alignment of said frequency of reciprocation or oscillation with, or more closely with, the frequency of the waves is known as, and referred to herein as, "tuning", and preferably increases the amount of energy that is captured by the absorber. Such tuning is made possible in some embodiments by adjusting the buoyancy and/or mass of the absorber, preferably in accordance with a property of the device, such as for example a position of the absorber along a wave cycle of said waves and/or a position of the absorber along the rotation arc and/or an angle of the arm member relative to a vertical plane occupied by the pivot point; and/or a particular sea state and/or a property of the body of water. Therefore, in preferable embodiments the mass of the absorber is adjustable. In example such embodiments, the absorber preferably comprises at least one internal compartment, and optionally comprises a plurality of said internal compartments. In preferable embodiments, the device further comprises a pump arranged to selectively displace a first fluid in said internal compartment, with a second fluid, wherein the first fluid and the second fluid comprise differing densities at room temperature. The first fluid is preferably air, and the second fluid is preferably water, or vice versa. Embodiments will be appreciated wherein any suitable means for adjusting the mass and/or buoyancy of the absorber is provided.

In preferable embodiments, said displacement is arranged to define a ratio of the first fluid and the second fluid selected from a predefined set of ratios, each said ratio associated with a corresponding property of said body of water. Therefore, the device is preferably arranged to "tune" the frequency of the absorber reciprocation/oscillation along the rotation arc in accordance with a property of the body of water, optionally defining a sea state, for example. The property may preferably be one or more selected from the group: a wave height; a wave frequency; a wave speed; a wave force; a wave shape. Said ratio may, for example, be selected according to a plurality of property measurands measured across multiple timepoints. The property may, for example, constitute a value determined or inferred from the plurality of measurands, such as an average or a variance thereof. The ratio may be selected according to any suitable formula including one or more said properties as variables. Embodiments will be appreciated wherein the ratio is selected according to any suitable property of the body of water, and preferably selected to substantially align frequency of reciprocation/oscillation of the absorber along the rotation arc with a wave frequency of the body of water.

Preferably the absorber contains a plurality of internal compartments arranged to be selectively filled with the first and/or second fluid at predefined ratios, to give the absorber a number of predefined tuning states for different sea states. Wholly filling smaller internal compartments with the first or second fluid, such as water, prevents sloshing of the contained fluid and is preferable to adjusting the amount of fluid in a single large internal compartment where sloshing may lead to unpredictable absorber behavior and/or unpredictable forces on the absorber structure. Other suitable mechanisms, such as the provision of one or more baffles located in the one or more internal compartments, may be used in some embodiment to further prevent said sloshing.

In some embodiments, the device preferably further comprises: a said arm member extending from the pivot point, the arm member arranged to rotate about the pivot point; and wherein the buoyant wave energy absorber is affixed proximate an end of the arm member distal to the pivot point. In most preferable such embodiments, the absorber may be fixed to the arm member such that the absorber is unable to rotate relative to the arm member. In some preferable embodiments having an arm member, when said surface of the body of water is substantially flat, the arm member is preferably positioned at a rest angle relative to a vertical plane of the pivot point, the rest angle being selected from between 15° to 70°. The rest angle is more preferably selected from between 25° to 65°. The rest angle preferably defines an optimum orientation of the arm member, and therefore the absorber, in order to optimize wave energy capture through reciprocation as a result of impetus from wave movement.

In the operating mode, the arm member is preferably arranged to move between a first position and a second position defining a movement angle therebetween, the movement angle being up to 90° located about the rest angle, and may for example be located to provide up to a 45° arm member movement either side of the rest angle. The movement angle is preferably up to 60° located about the rest angle, and may for example be located to provide up to a 30° arm member movement either side of the rest angle. It will be appreciated that any suitable rest angle and movement angle may be used, wherein the rest angle is an angle greater than 0° downwave of a vertical plane occupied by the pivot point. In some embodiments, any such arm member is preferably as short as possible to minimize torque about the pivot point, and some embodiments will be appreciated wherein it is preferable to have no arm member, such that the absorber body is affixed directly to the pivot point, in order to minimize said torque. It will be appreciated that, in embodiments wherein there is no arm member, any features described herein in relation to the arm member, may apply equally to an imaginary straight line extending between the pivot point and an outer edge of the absorber distal to the pivot point. For example, discussion herein relating to the rest angle of the arm member, may be applied equally to said imaginary line in embodiments without a said arm member. Therefore, the rest angle may refer instead to the rest angle of the imaginary line relative to a vertical plane of the pivot point.

The device preferably further comprises a yaw mechanism arranged to yaw the pivot point and/or the absorber on a plane perpendicular to a plane of the rotation arc, herein termed the yaw plane. Such yawing is preferably arranged to reorient the absorber, and preferably a wave-engaging surface thereof, such that the largest dimension of the absorber opposes a prevailing wave direction. This feature may be preferable since waves in a body of water may not have the same prevailing direction over time, and therefore to maximize wave energy capture, the device, or an operator thereof, may be required to adjust an orientation of the absorber such that said wave direction is adequately opposed in order to facilitate wave energy capture by the device. In such embodiments, the device may further comprise a wave direction sensor arranged to inform said yawing. Embodiments will be appreciated wherein any suitable means of determining a prevailing wave direction is used. The term "prevailing wave direction" as used herein will be understood within the context of the present invention to mean a direction in which a largest wave propagation force is provided or detected within the body of water, and may constitute an average said wave direction or more than one wave direction.

In some preferable embodiment, said yawing is arranged to reposition the wave-engaging face of the absorber opposing an average or prevailing wave direction. The yaw mechanism is preferably further arranged to restrict said yawing following said repositioning. Therefore, rotation of the device using said yaw mechanism is preferably robust to the wave movement, such that once the absorber is reoriented, action of the waves does not cause further rotation of the device along said plane. Any said further rotation would constitute wasted energy. Preferable embodiments comprise an active yaw mechanism requiring a power supply in order to perform said yawing. Other suitable embodiments may comprise a passive yaw mechanism arranged to allow the absorber, and preferably a wave-engaging surface thereof, to assume an orientation opposing a prevailing wave direction automatically, for example using a fin or rudder mechanism.

In some preferable embodiments, the yaw mechanism may be arranged to permit free rotation of the device on said plane, for example a complete 360° rotation. Without wishing to be bound by theory, unlike wind directions, wave directions often face fewer possible direction changes over time in bodies of water intended for the present invention, such as offshore locations in a sea or an ocean, and therefore in other preferable embodiments, said yawing may be limited to being performed within a yawing angle smaller than 360°, for example up to 90°, and more preferably up to 45°.

In preferable embodiments, the absorber comprises a width which is greater than a length or a height of the absorber, wherein said width of the absorber in the operating mode is positioned perpendicular to an average or prevailing wave direction. A width which is the greatest dimension of the absorber may be preferable to maximize the surface area of the absorber, and preferably a wave-engaging surface thereof, arranged to oppose the prevailing wave movement/direction, and therefore maximize energy captured from said waves. In such embodiments, correct alignment of the absorber relative to the direction of the waves is preferable in order to maximize energy capture. Such embodiments therefore preferably comprise a yaw mechanism as described herein, arranged to orient a wave-engaging surface of the absorber to oppose a prevailing wave direction.

In preferable embodiments, the device further comprises an energy converter arranged to convert rotation of the absorber to the useful energy, an optionally arranged to convert rotation of a said arm member by the absorber to the useful energy. The energy converter is preferably a rotational generator (which may, for example, be electrical or hydraulic). Any other suitable form of energy converter will be appreciated capable of converting wave energy to useful energy, such as electrical energy, for example: a linear electrical generator; a hydraulic cylinder; any kind of linear generator combined with a mechanism arranged to convert rotational motion to linear motion, such as a crank arm, or a rack and pinion. The rotational generator may be further coupled to a gear arrangement, such as a gearbox, arranged to translate the speed of rotation of the absorber and/or arm member about the pivot point to better suit the specific energy converter type used. It will be appreciated that in some preferable embodiments, the energy converter may be arranged to provide the additional function of an absorber- and/or arm member-movement actuator or limiter, and may receive a power supply for performing this function. A purpose for such movement actuation or limiting is preferably to move and retain the absorber above the surface of the body of water, for example in a storm survival mode. In some embodiments, the energy converter may rotate the absorber and/or arm member about the pivot in order to move the absorber to a suspended position in which the absorber is positioned above the surface of the body of water. The energy converter may maintain the absorber in a fixed position by limiting any further movement of the absorber and/or arm member, or a further movement limiting mechanism, such as an affixing means, may be used to maintain the absorber in the suspended position. The movement limiting mechanism preferably reduces load placed on the energy converter, which may otherwise require a power supply to maintain the absorber in the suspended position. Any suitable such movement limiting member will be appreciated. It will also be appreciated that any suitable separate component or system may be used to provide the functions of said energy conversion and movement actuation/limiting.

In preferable embodiments, the device further comprises a buoyant platform arranged to be tethered to a bed of said body of water, the platform being submerged in the operating mode and arranged to support the pivot point above said surface of the body of water. The platform is preferably any suitable buoyant platform is preferably arranged to provide a stationary pivot point relative to said wave movement in the operating mode. The buoyancy of the platform is preferably arranged to counteract tension in a mooring means arranged to tether the buoyant platform to the bed of the body of water, such that said tension provides stability to the platform in the operating mode, keeping the pivot point substantially stationary relative to said wave movement. Said mooring means is preferably arranged to be installed at a desired location such that the platform may be transported to the desired location, while supporting said pivot point above the surface of the body of water, ahead of installation. The buoyant platform is preferably a tension leg platform (TLP), but any suitable platform will be appreciated.

The device preferably further comprises a storm survival mode wherein the absorber is positioned above said surface of the body of water, wherein said surface is defined by a maximum wave height of the body of water. The storm survival mode is different to the operational mode in that the absorber is positioned above the surface of the body of water such that it does not capture wave energy. The purpose of the storm survival mode is to limit the effect of excessive wave forces (such as those experienced during a storm) on the absorber, wherein said forces may cause damage or excessive wear to components of the device or an energy conversion system coupled thereto. Specifically in the storm survival mode, the position of the surface of the body of water relative to the absorber is expected to change since during a stormy (or large) sea state the waves of the body of water will be expected to be variable and more pronounced than in a calmer sea state. Therefore, said surface in the context of the storm survival mode, is determined according to a maximum wave height of the body of water. The absorber may, in said embodiment, be suspended above the surface of the body of water, for example with the arm member (or said imaginary line) positioned at an angle relative to a vertical plane occupied by the pivot point. In such a position the absorber may exert a downward force on the arm member and/or pivot point such that torque is applied to the pivot point, and any movement limiting mechanism thereof functioning to suspend the absorber and/or arm member at the suspended position. The device may therefore further comprise a fixing means arranged to affix the absorber and/or arm member at the suspended position such that the pivot point (and any movement limiting mechanism) is relieved of any torque applied thereto by the weight of the absorber, and optionally the arm member. Embodiments will be appreciated wherein in the storm survival configuration, the arm member (or said imaginary line) is substantially parallel with the vertical plane occupied by the pivot point, such that minimal rotational torque is applied to the pivot point (and any movement limiting member) by the absorber, and optionally the arm member.

The device preferably further comprises a transport mode wherein the absorber is positioned above said surface of the body of water, and further positioned substantially below the pivot point in a vertical plane occupied by the pivot point. The transport mode is preferably arranged to permit transport of the device to a desired location for fixation. In the transport mode the pivot point is preferably located at a height such that the arm member (or said imaginary line) is arranged to align with a vertical plane occupied by the pivot point while the absorber remains above the surface of the body of water. This configuration preferably minimizes energy required to suspend the absorber above the surface of the body of water. In embodiments without an arm member, it will be understood that "substantially below the pivot point" means that a majority of the absorber is positioned below the pivot point.

In some preferable embodiments, the pivot point is supported at a pivot point height, wherein the pivot point height is adjustable. Any suitable pivot point support structure or nacelle supporting the pivot point may therefore have a height thereof adjusted. Adjustment of the pivot point height preferably provides an arm member (or said imaginary line) angle relative to the vertical plane occupied by the pivot point, which is optimal throughout the range of tides and waves experienced. Such an adjustment of the pivot point height may, for example, correspond with a detected average sea level and/or average wave height. Such a height adjustment preferably also allows the present invention to have an arm member of minimal length, therefore permitting a reduction in torque experienced by a power take off or energy converter affixed to the arm member and arranged to be driven by a rotation thereof about the pivot point. The pivot point height adjustment may further permit movement of the pivot point close to a surface of the body of water in the operating mode but away from the surface of the body of water in large sea states, for example in the storm survival mode.

Preferably, the pivot point is supported at the pivot point height by at least one support arm rotationally affixed at a first end thereof proximate the pivot point, wherein a rotation of the at least one support arm about a second end thereof, distal to the first end, is arranged to adjust the pivot point height. The pivot point is most preferably supported at the pivot point height by at least two said support arms. The at least two support arms are preferably affixed parallel to one another. In such embodiments, two support arms form parallel sides of a parallelogram which preferably provides optimal stability for the pivot point at the pivot point height, while not permitting rotation of any pivot point support structure or nacelle about the pivot point during said height adjustment. Said support structure or nacelle is therefore maintained in a substantially constant orientation throughout the pivot point height adjustment. Rotation of the support arms about the second end thereof to adjust the pivot point height may be performed by any suitable actuator, for example a motor or hydraulic ram. The actuator that cause rotation of the one or more, and preferably two or more, support arms about the second end thereof may be selected to be suitable for high force, occasional use, for example hydraulic cylinders. A power take-off or energy converter actuator may be selected to be suitable for lower torque and continuous use, for example a motor and gearbox.

In accordance with a further aspect of the present invention, there is provided a buoyant offshore renewable energy system comprising a device in accordance with the first aspect.

It will be appreciated that any features described herein as being suitable for incorporation into one or more aspects or embodiments of the present disclosure are intended to be generalizable across any and all aspects of the disclosure.

BRIEF DESCRIPTION OF THE DRAWINGS

The accompanying drawings, which are incorporated in and constitute a part of the specification, illustrate embodiments of the disclosure and together with the detailed description herein, serve to explain the principles of the disclosure. It is emphasized that, in accordance with the standard practice in the industry, various features are not drawn to scale. In fact, the dimensions of the various features may be arbitrarily increased or reduced for clarity of discussion. The drawings are only for purposes of illustrating preferred embodiments and are not to be construed as limiting the disclosure.

FIG. 10A depicts a side view of a further embodiment of a wave energy capturing device in accordance with the first aspect in an operating mode supported on a buoyant offshore renewable energy system in accordance with the second aspect, and having a pivot point supported at a first pivot point height, in accordance with an aspect of the present disclosure; and FIG. 10B depicts the embodiment of FIG. 10A wherein the pivot point is supported at a second pivot point height, in accordance with an aspect of the present disclosure.

DETAILED DESCRIPTION FOR CARRYING OUT THE INVENTION

Figure 1:
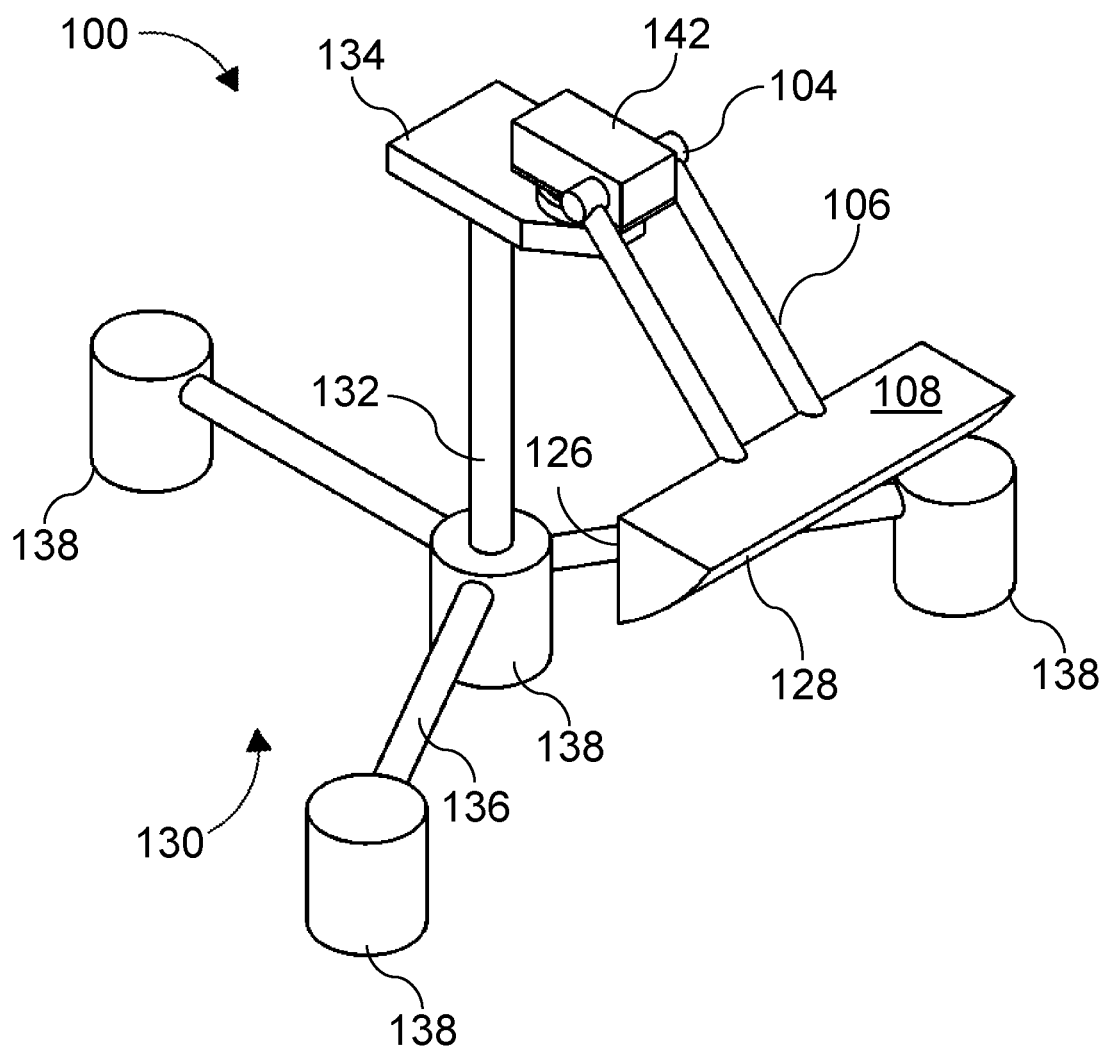
FIG. 1 depicts a perspective view of a wave energy capturing device in accordance with the first aspect in an operating mode supported on a buoyant offshore renewable energy system, in accordance with an aspect of the present disclosure.

Referring to FIG. 1, a perspective view of an example embodiment of a wave energy capturing device 100 is shown in accordance with the first aspect of the present disclosure. The device 100 is arranged to capture and convert wave energy from a body of water (transparent) to useful energy (which in the example embodiment shown, is electrical energy), and comprises: a pivot point 104; an elongate arm member 106 extending from proximate the pivot point 104, the arm member 106 arranged to rotate about the pivot point 104. The device 100 further comprises and a buoyant wave energy absorber 108 affixed proximate an end of the arm member 106 distal to the pivot point 104.

Figure 2:
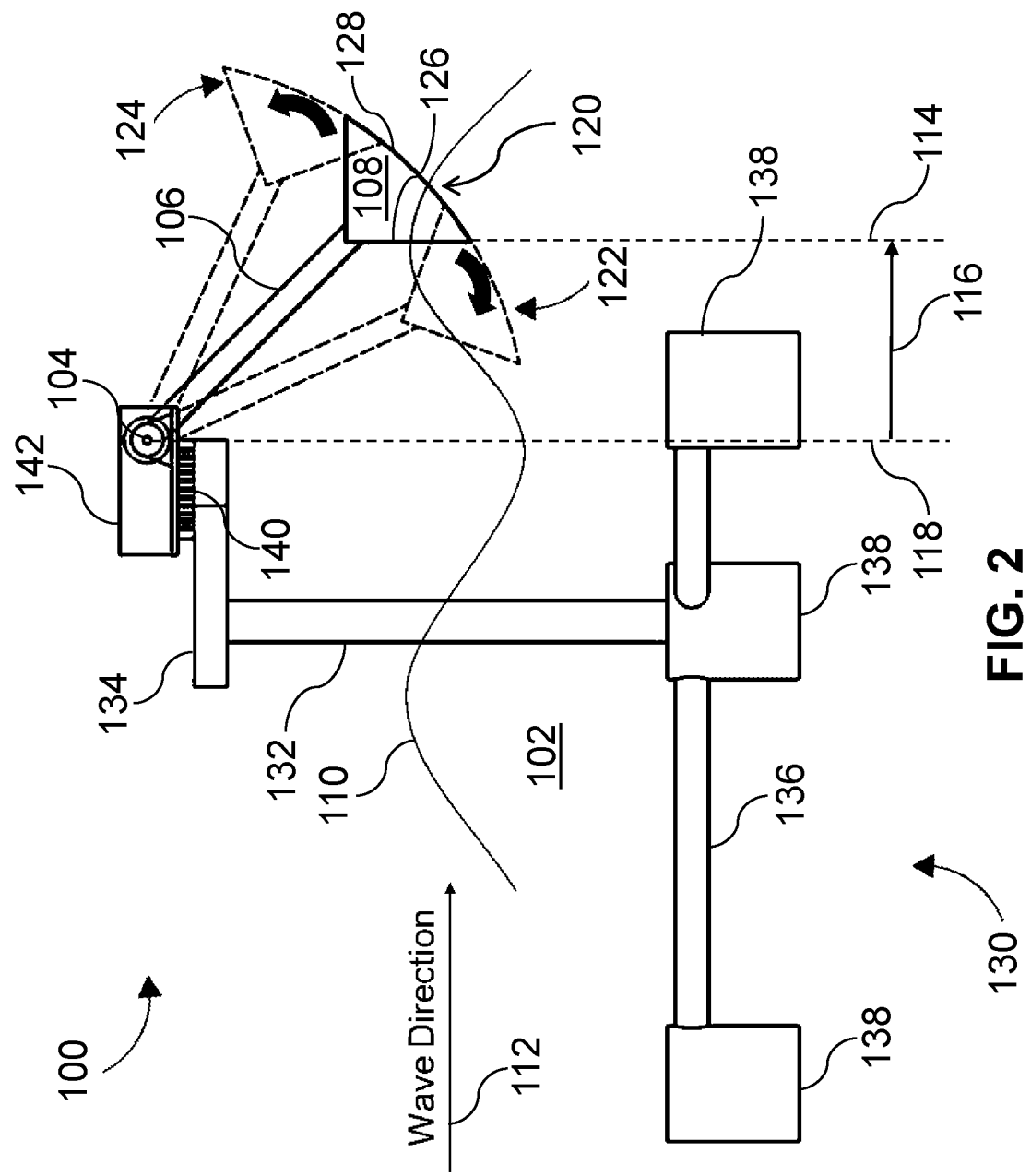
FIG. 2 depicts a side view of the embodiment of FIG. 1 in a first prevailing wave direction, in accordance with an aspect of the present disclosure.

A side view of the device 100 is shown in FIG. 2 in an operating mode in which the device 100 is arranged to capture said wave energy, wherein in the operating mode shown: the pivot point 104 is supported above a surface 110 of the body of water 102 and is held substantially stationary relative to wave movement in a prevailing wave direction 112 within the body of water 102. Further in the operating mode shown, the buoyant absorber 108 is positioned in engagement with said surface 110 of the body of water 102 at an operating location, located in a plane 114 positioned downwave 116 of a vertical plane 118 occupied by the pivot point 104. In the operating mode shown, the absorber 108 is arranged to rotate about the pivot point 104 under impetus from said wave movement, from an at rest position 120 and between a first position 122 and a second position 124 (each depicted using dotted lines in FIG. 2) said rotation defining a rotation arc of the absorber 108 along which the absorber 108 is arranged to reciprocate in the operating mode.

In the example embodiment 100 shown, the absorber 108 comprises a substantially flat wave-engaging surface 126 arranged to be positioned parallel to the vertical plane 118 occupied by the pivot point 104 in the at rest position 120. The absorber 108 further comprises a curved downwave surface 128; the curved downwave surface 128 positioned downwave 116 of the wave-engaging surface 126 in the operating mode shown. In the embodiment 100 shown, the wave engaging surface 128 is at a terminal end of the absorber 108 diametrically opposed to the pivot point 104.

As shown, at least a portion of the downwave surface 128 comprises a curve extending from adjacent the wave-engaging surface 126 substantially along a portion of the rotation arc tracked by a downwave surface 128 of the absorber 108.

In the embodiment 100 of FIG. 2, the pivot point 104 of the wave energy capturing device is shown supported on a buoyant platform 130, the platform 130 comprising a base portion, a mast extending from the base portion, and an upper portion supported on an end of the mast 132 distal to the base portion, The base portion is formed of a hollow framework 136 having a plurality of buoyancy tanks 138 distributed thereon. In the operating mode shown, extending from the base portion is a mooring means (not shown) tethering the buoyant platform 130 to a bed (not shown) of the body of water 102, such that the base portion is submerged beneath the surface 110 of the body of water 102, and the pivot point 104 is supported on the upper portion 134 above the surface 110 of the body of water 102.

The buoyancy provided by the buoyancy tanks 138 is arranged to cause tension in the mooring means so as to provide stability to the platform 130 in the operating mode, such that the pivot point 104 is held substantially stationary relative to said wave movement.

In use, as the absorber 108 rotates along the rotation arc from the at rest position 120 and between the first position 122 and the second position 128 under impetus from said wave movement, the curved downwave surface 128 thereof substantially follows the rotation arc and is substantially concentric therewith. As such, during said rotation, minimal opposing force is applied to the body of water 102 by the downwave surface 128. As such, the absorber 108 acts to only minimally oppose the wave forces acting on the wave-engaging surface 126 thereof in the prevailing wave direction 112, and therefore causes only minimal, if any, wave propagation, thus allowing the wave-engaging surface 126 to capture a maximum amount of wave energy from said wave movement.

Figure 3:
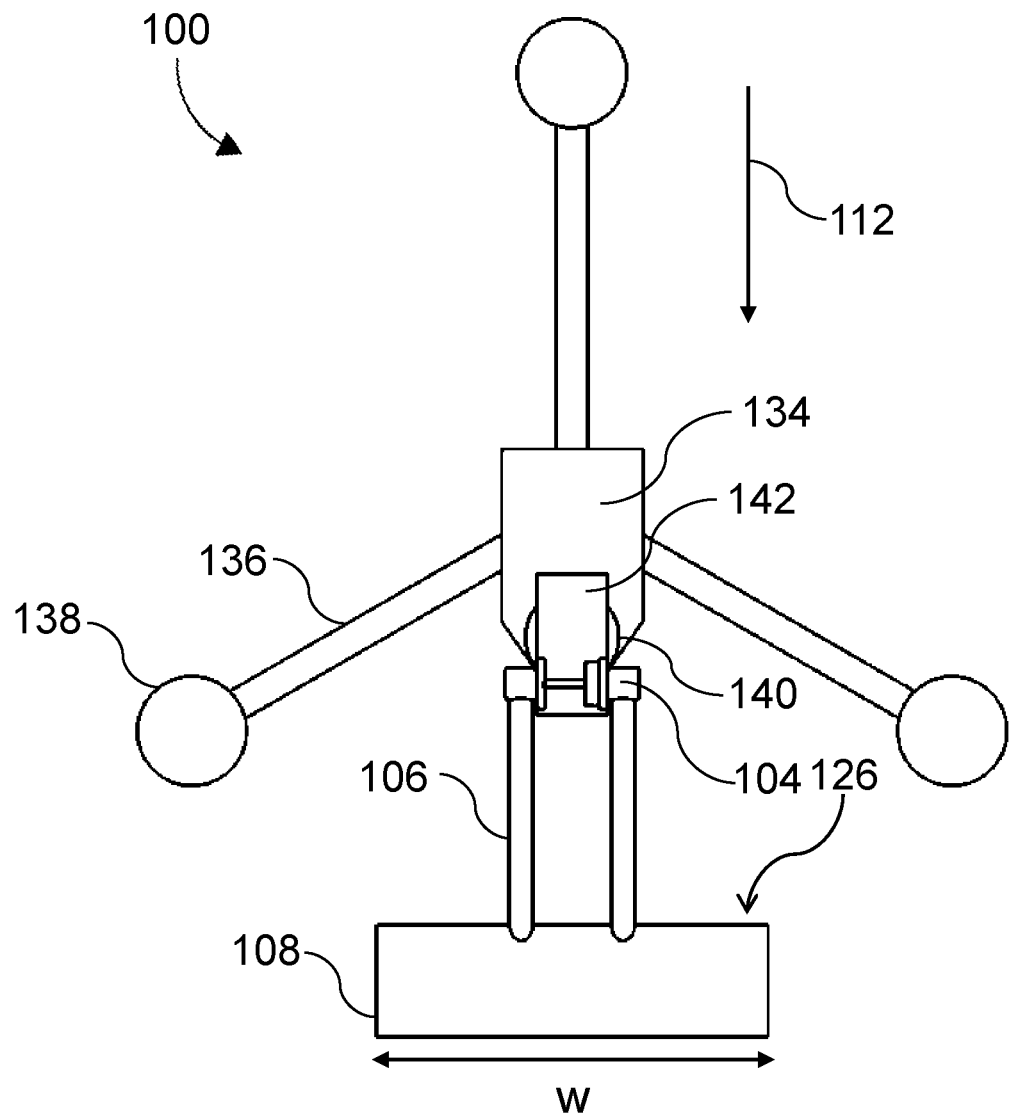
FIG. 3 depicts an elevational view of the embodiment of FIG. 2, in accordance with an aspect of the present disclosure.

An elevational view of the device of FIG. 2 is shown in FIG. 3. As can be seen more clearly in FIG. 3, the absorber 108 comprises a width W which is greater than any other dimension thereof. This width W enables the wave-engaging surface 126 of the absorber 108 to oppose oncoming wave movement such that a maximum amount of wave energy is captured.

Figure 4:
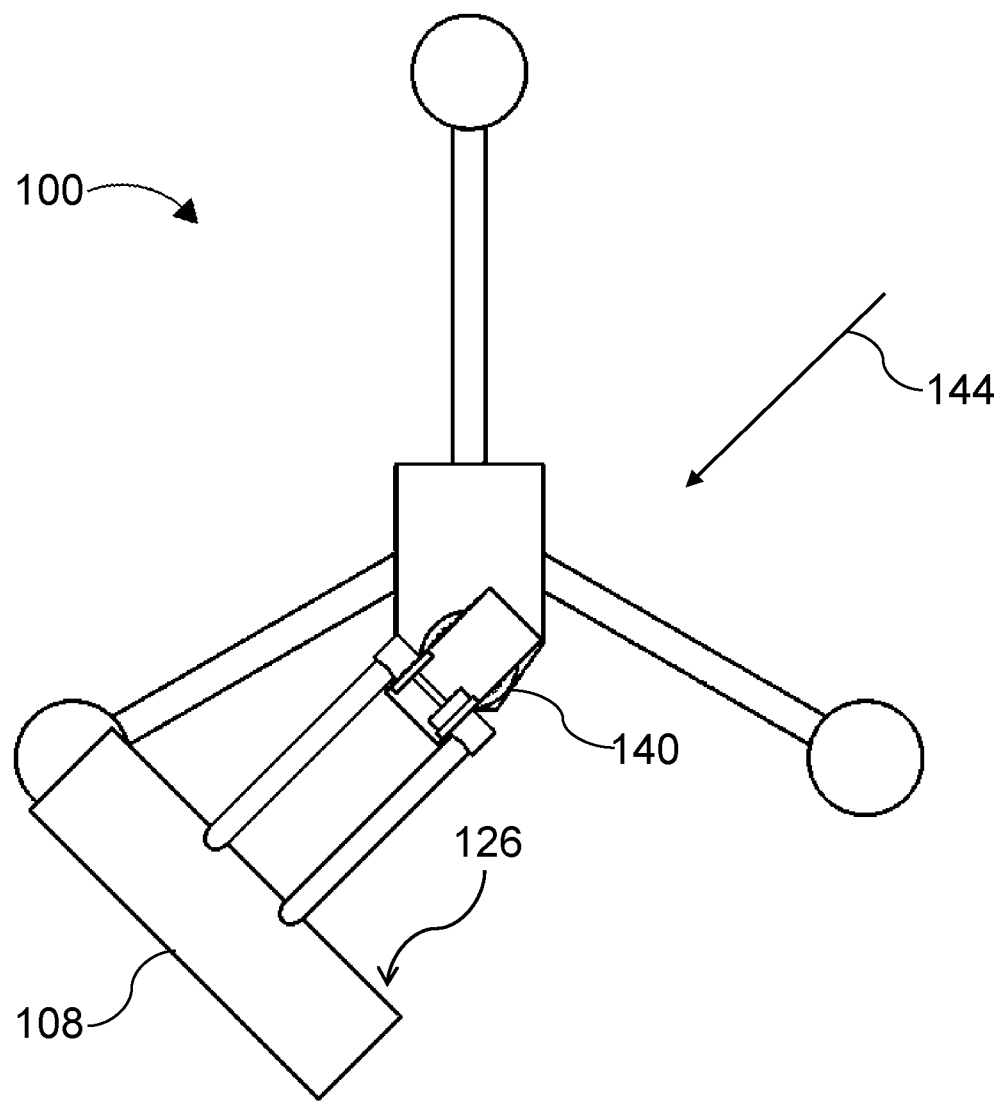
FIG. 4 depicts an elevational view of the embodiment of FIG. 1, wherein the wave energy capture device is rotated on a yaw mechanism thereof to be aligned with a second prevailing wave direction, in accordance with an aspect of the present disclosure.

In the example 100 of FIG. 2 and FIG. 3, the device is shown further comprising a yaw mechanism 140 positioned between the upper portion 134 of the platform 130 and the pivot point 104. The yaw mechanism 140 is arranged to be driven by a motor 142 to yaw the pivot point 104 and the affixed absorber 108 on a plane perpendicular to a plane of the rotation arc, such that the absorber 108 can be repositioned with the wave-engaging surface 126 thereof opposing a different prevailing or average wave direction to the prevailing wave direction 112 shown. This yaw action of the yaw mechanism 140 can be seen more clearly when comparing the plan view of FIG. 3, with the plan view shown in FIG. 4 depicting the absorber 108 repositioned on the yaw plane by the yaw mechanism 140, such that the wave-engaging surface 126 thereof opposes a different prevailing wave direction 144 to the prevailing wave direction 112 depicted in FIG. 2 and FIG. 3. Following the repositioning shown in FIG. 4, the yaw mechanism 140 is arranged to restrict further movement of the absorber 108 along the yaw plane in order to minimize energy loss through said movement, providing rigidity against said movement and enabling a greatest amount of wave energy capture in the prevailing wave direction 112, 144 by the absorber 108.

Together, the features of the embodiment of FIG. 1 to FIG. 4 form an example embodiment of a buoyant offshore renewable energy system in accordance with the second aspect.

Figure 5:
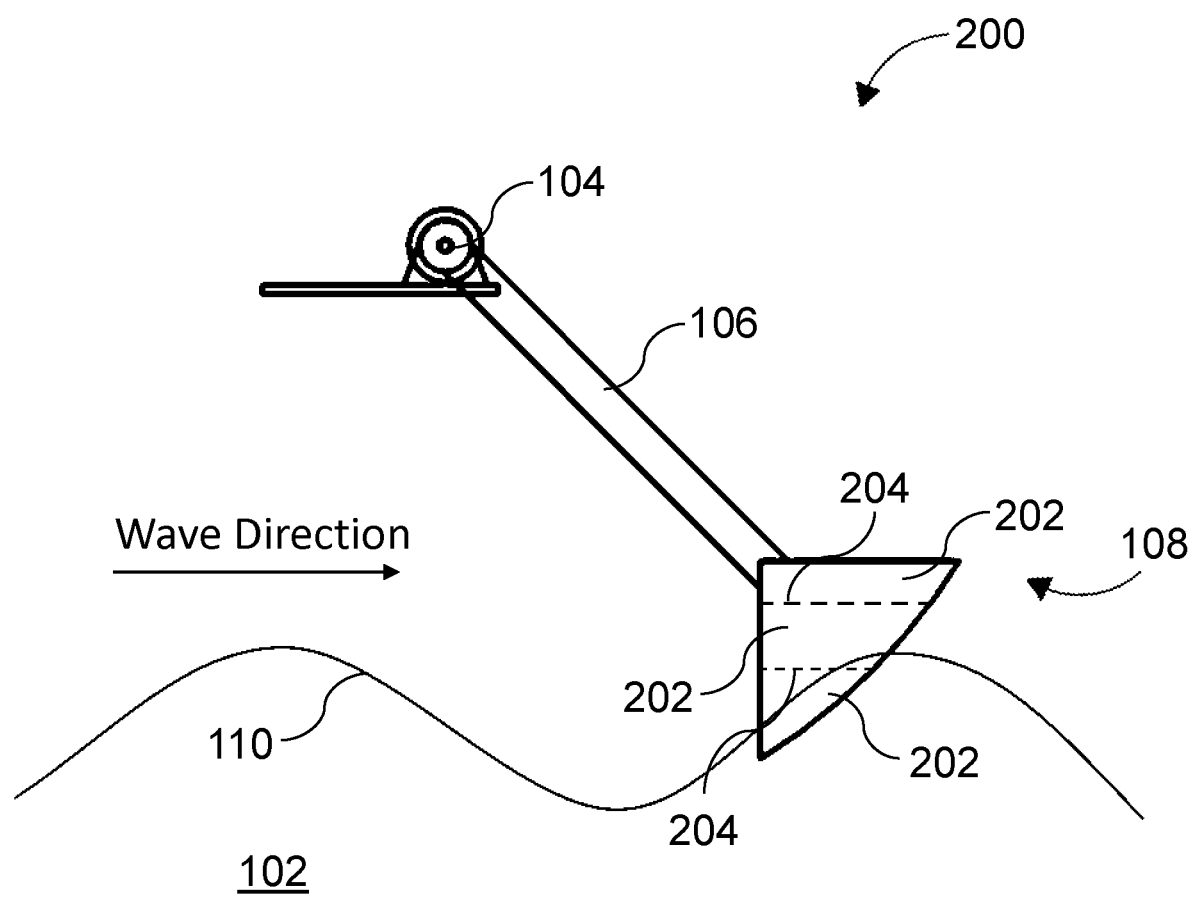
FIG. 5 depicts a cutaway side view of a further embodiment of the first aspect comprising an absorber having internal compartments, in accordance with an aspect of the present disclosure.

A simplified cut-away side view of a further embodiment of a wave energy capturing device 200 is shown in FIG. 5. The embodiment 200 is mostly equivalent to the embodiment of FIG. 1 and equivalent numbering is used where possible. The embodiment 200 of FIG. 5 comprises an absorber 108 having a plurality of internal compartments 202, adjacent compartments 202 being separated from one another by a compartment wall 204. The device 200 further comprises a pump (not shown) arranged to pump water from the body of water 102 into, and out of, each of the compartments 202 in order to displace an amount of air therein. This pumping redefines a ration of air:water within each of the compartments, and thereby adjusts the mass of the absorber 108. In the embodiment shown, the pump is arranged to adjust, or "tune", the mass of the absorber 108 selectively based on a property of the body of water 102. The device 200 further comprises a plurality of sensors (not shown) arranged to detect and measure the property of the body of water, and a processor is arranged to determine from said measurement, that the property of the body of water is within one of a plurality predefined ranges. In the example 200 shown, each of the predefined property ranges corresponds to a respective air:water ratio, such that upon determining that the property of the body of water is within one of the predefined ranges, the processor is arranged to control the pump to achieve the corresponding air:water ratio associated with said range. In the example embodiment shown, the property is an average wave height determined from a series of wave height measurements. Embodiments will be appreciated wherein the property is any suitable property of the body of water, or of the device, as described herein.

Figure 6:
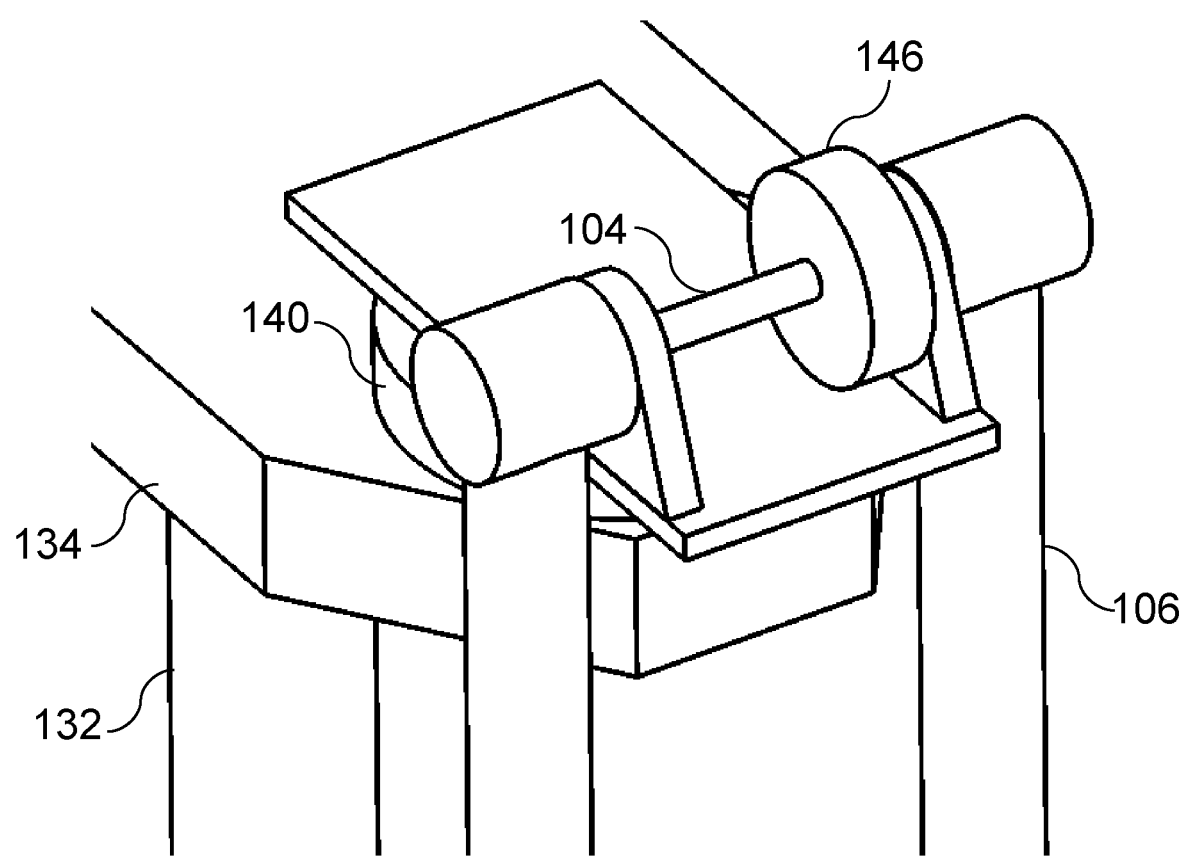
FIG. 6 depicts a close-up perspective view of the pivot point of the embodiment of FIG. 1, in accordance with an aspect of the present disclosure.

A close-up perspective view of the pivot point 104 of the embodiment of FIG. 1 to FIG. 3 is shown in FIG. 6. As shown more clearly in FIG. 6, the device further comprises a wave energy converter (WEC) 146, located about the pivot point 104 and arranged to be driven by rotation of the arm member 106 and absorber 108 about the pivot point 104. In the embodiment shown, the WEC 146 takes the form of a rotational generator arranged to convert the rotational movement of the arm member 106 and absorber 108 to electrical energy, for output to an electrical energy store (not shown). Embodiments will be appreciated, wherein the WEC is any suitable energy converting device as described herein. The device may comprise a power line arranged to transfer electrical energy to a remote storage device or for immediate use, or alternatively the device may comprise an on-board electrical storage device such as a battery, for delayed transmission or use.

Figure 7:
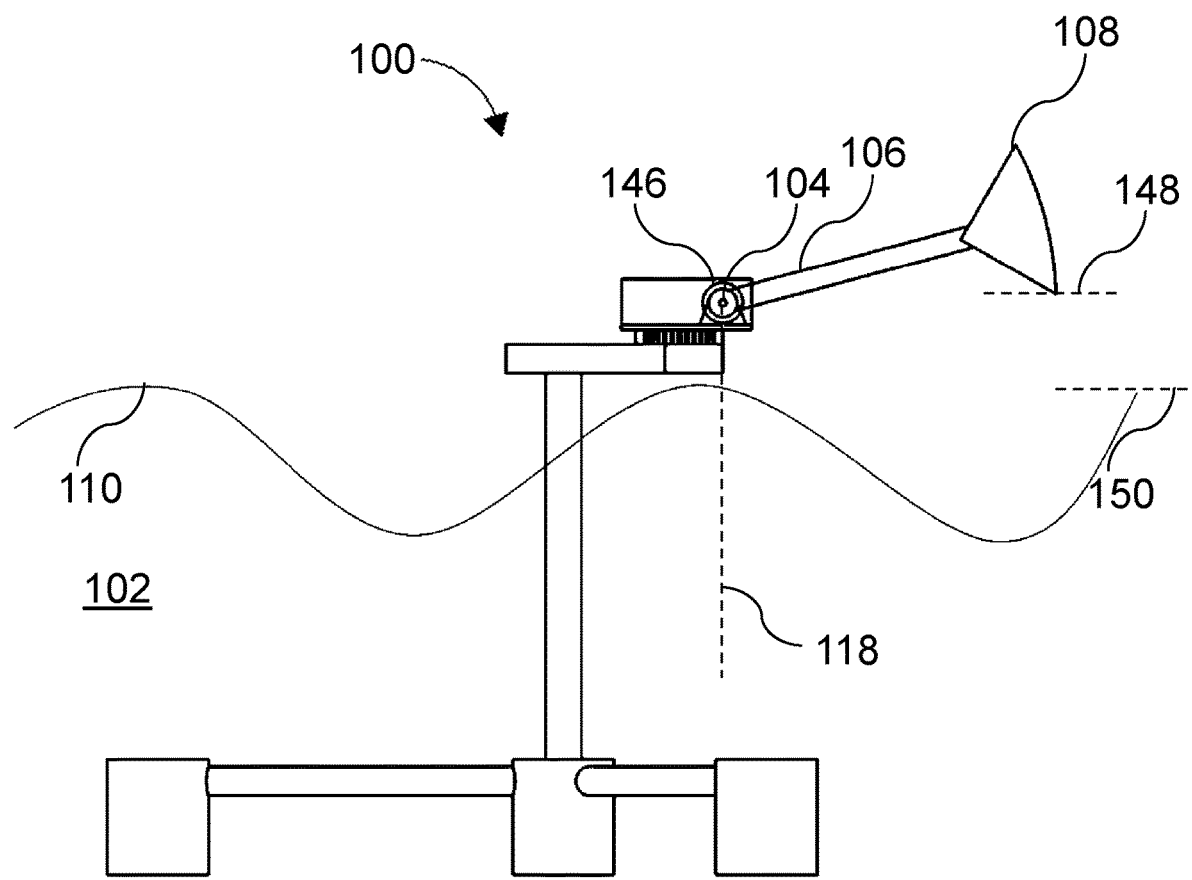
FIG. 7 depicts a side view of the embodiment of FIG. 1 shown in a storm survival mode, in accordance with an aspect of the present disclosure.

A side view of the embodiment 100 of FIG. 1, shown in a storm survival mode, is depicted in FIG. 7. In the storm survival mode shown, the WEC 146 is used as a movement actuator and movement limiter of the arm member 106 such that the absorber 108 is raised to a suspended position 148 located above a maximum wave height 150, defined by a maximum height of the surface 110 of the body of water 102. In the embodiment shown, the rotational axis of the WEC 146 experiences torque under the load of the arm member 106 and the absorber 108. Embodiments will be appreciated, wherein once the absorber 108 reaches the suspended position 148, a fixing means is used to fix the arm member 106 in place such that continued power is not required to the WEC in order to maintain the absorber 108 at the suspended position 148. In the storm survival mode shown, the arm member 106 is positioned at a greater angle relative to the vertical plane 118 occupied by the pivot point 104 than when the arm member 106 is at the at rest position 120 shown in FIG. 2.

The storm survival mode shown in FIG. 7 is used when excessive wave forces are detected or predicted, such as those experienced during a storm. The excessive wave forces will be understood by the skilled addressee as any wave forces greater than a predetermined safe threshold, such that damage to the device may occur.

Figure 8:
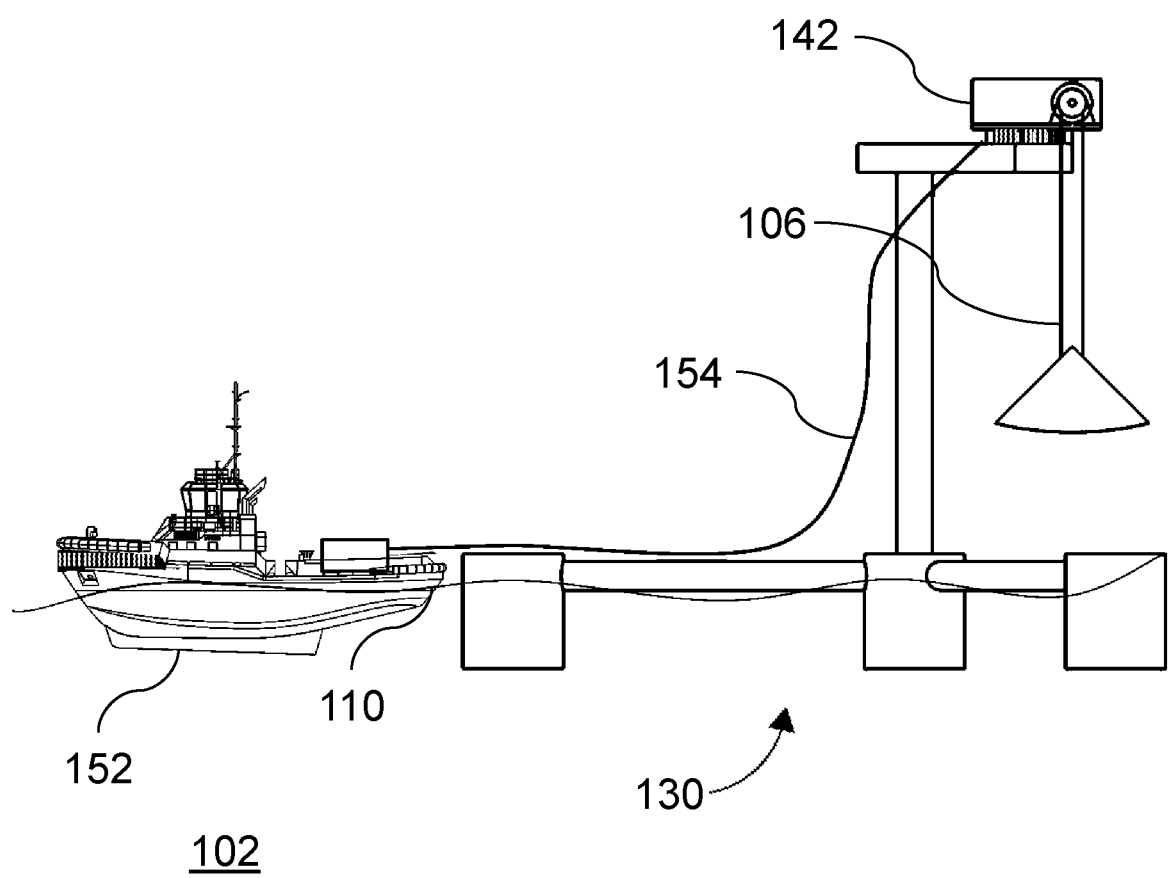
FIG. 8 depicts a side view of the embodiment of FIG. 1 shown in a transport mode, in accordance with an aspect of the present disclosure.

Referring to FIG. 8, a side view of the embodiment 100 of FIG. 1 is shown depicted in a transport mode, or surface mode, wherein the platform 130 is positioned floating on the surface 110 of the body of water 102. In the example shown, the arm member 106 in the transport mode is aligned with the vertical plane occupied by the pivot point 104. In this position the absorber 108 remains above the surface 110 of the body of water 102. Therefore, minimal to no load is required from the WEC 146 in the transport mode shown in order to maintain the absorber 108 above the surface 110 of the body of water 102. It may be preferable for the absorber 108 to remain above the surface 110 of the body of water 102 in the transport mode shown so that wave forces do not act on the absorber 108, which could destabilize the floating and untethered device in the body of water 102, negatively affecting the ease of transport of the device.

In the transport mode shown, device is arranged to be towed along the surface 110 of the body of water 102 to a desired deployment location by a deployment vessel 152. At the desired deployment location, the deployment vessel 152 in the example shown is arranged to power the motor 142 by way of a temporary power line 154 affixed therebetween. arranged to drive winches (not shown) of the device, the winches spooling a mooring means (not shown), such as a rope or chain anchored to the bed (not shown) of the body of water 102, thereon in order to submerge the device to achieve the operating mode shown in FIG. 2.

Figure 9:
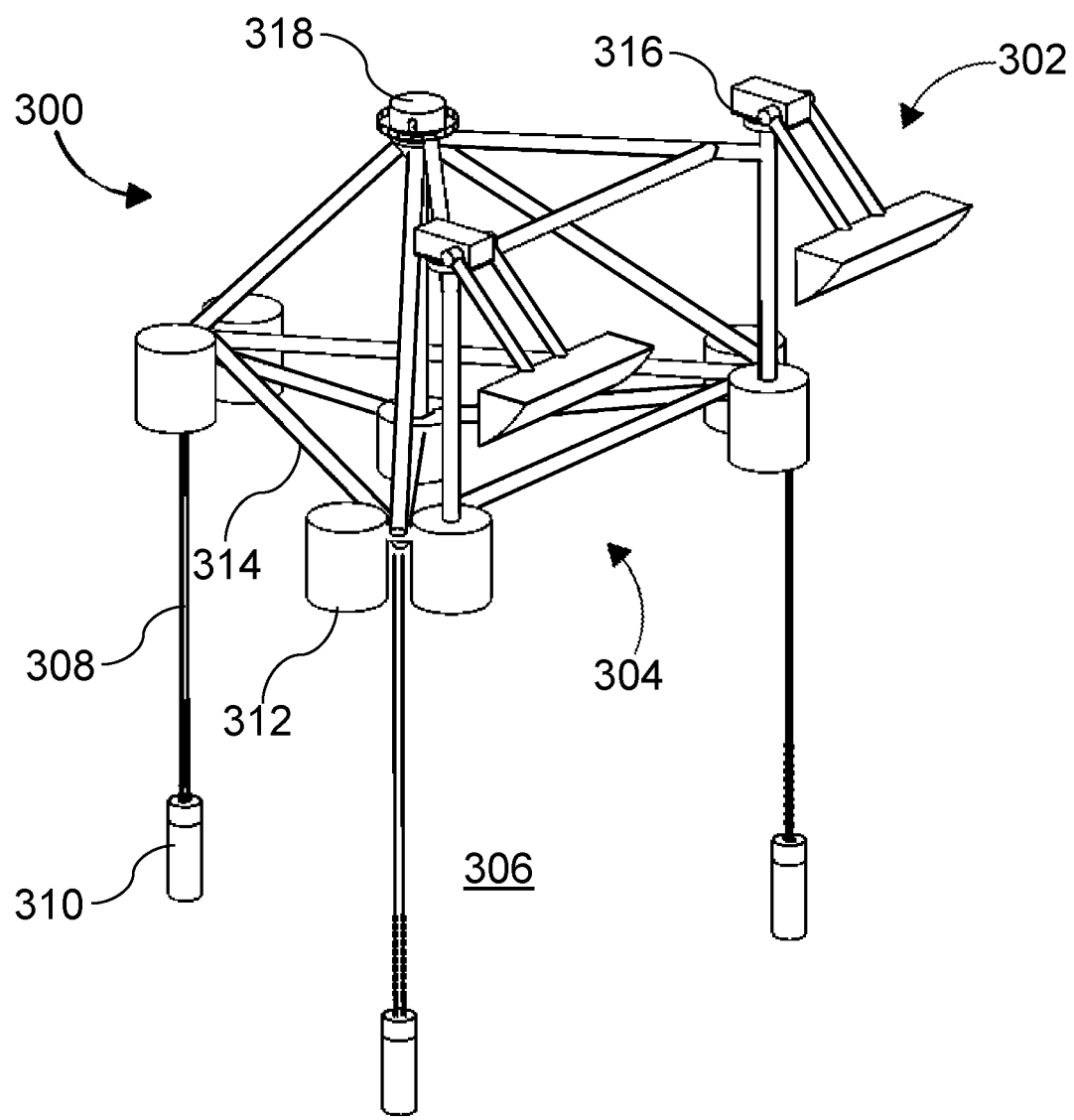
FIG. 9 depicts a perspective view of an alternative embodiment of a buoyant offshore renewable energy system in accordance with the second aspect, in accordance with an aspect of the present disclosure.

A further embodiment of a buoyant offshore renewable energy system 300 is shown in the perspective view of FIG. 9. The embodiment 300 is substantially as described herein in relation to FIG. 1 to FIG. 8 but comprises two wave energy capturing devices 302. A platform 304 of the embodiment 300 is tethered to a bed 306 of a body of water (transparent) by a mooring means comprising a pair chains 308 affixed to a corresponding anchor point 310 affixed to the bed 306. The chains 308 extend from the platform 304 proximate a center of buoyancy defined by a corresponding pair of buoyancy tanks 312 so as to maximally counteract the buoyancy provided by said tanks, thereby maximally stabilizing the platform 304 in the body of water. The framework 314 of the platform 304 of the embodiment 300 shown is an open framework so as to minimize wave forces exerted thereon by the body of water, such that the platform is maximally stabilized in the operating mode shown, and that the pivot points 316 of the devices 302 are held substantially stationary relative to wave movement in the body of water. A central mast 318 of the platform 304 may in some embodiments support a wind turbine (not shown), and in the embodiment shown supports a control, maintenance and storage facility to be occupied by operational personnel during deployment and maintenance of the system 300.

A further embodiment 400 of a wave energy capturing device in accordance with the first aspect is shown in FIG. 10A. The embodiment 400 is shown in an operating mode supported on a buoyant offshore renewable energy system in accordance with the second aspect. The system comprises a pivot point 402, an elongate arm member 404 and a buoyant wave energy absorber 406 substantially as described for the embodiment 100 of FIG. 1. As with the embodiment 100 of FIG. 1, the arm member 404 is positioned at an angle relative to a vertical plane occupied by the pivot point such that a wave engaging surface of the absorber 406 is positioned in a plane downwave of the vertical plane occupied by the pivot point 402. The pivot point 402 is located on a nacelle 408 housing a power take off (not shown) arranged to be driven by rotation of elongate arm member 404 about the pivot point 402 upon engagement of the buoyant absorber 406 with waves on the surface 410 of a body of water 412. The nacelle 408 is supported on each side thereof by a respective pair of parallel support arms 414 rotationally affixed to the nacelle 408 at a first end thereof. The parallel support arms 414 are also rotationally affixed to an upper section 416 of a central mast 418 upstanding upon a buoyant platform 420. The embodiment 400 shown comprises a height adjustment mechanism 422 taking the form of a hydraulic ram which in the example shown is rotationally affixed between the central mast 418 and one of the pair of parallel support arms 414. The platform 420 is affixed to a bed 424 of the body of water 412 by a series of mooring lines 425, the buoyancy of the platform 420 counteracting the effects of gravity on the mast 418 and the components of the wave energy capturing device supported thereon.

In the view depicted, the embodiment 400 is shown with the pivot point 402 positioned by the height adjustment mechanism 422 at a first pivot point height 426 relative to an average height 428 of the surface 410 of the body of water 412. In the operating mode shown, the pivot point 402 is maintained at all times above the average height of the surface 410 of the body of water 412 by the height adjustment mechanism 422, such that said angle of the elongate arm member 404 is maintained. At such an angle, the wave engaging surface of the absorber 406 is arranged to optimally capture wave energy as described herein. FIG. 10B depicts the same embodiment 400 as shown in FIG. 10A, wherein a different, higher average height 430 of the surface 410 of the body of water 412 is shown. In the configuration of FIG. 10B, the height adjustment mechanism 422 has positioned the pivot point 402 at a different, higher pivot point height 432 relative to the higher average height 430 of the surface 410 of the body of water 412, such that said optimal arm member angle is maintained.

The parallel support arms 414 in the embodiment 400 shown provide a substantially parallelogram support structure which optimally maintains the nacelle 408 at a substantially constant orientation throughout the height adjustment by the height adjustment mechanism 422. This preferably enables easier maintenance of said optimal arm member angle. For consistency the present description refers to the optimal arm member angle relative to a vertical plane occupied by the pivot point. It will be understood that maintaining an optimal angle of the wave engaging surface of the absorber relative to the vertical plane occupied by the pivot point may be equally relevant in providing continued optimal wave energy capture by the present invention.

Further embodiments within the scope of the present disclosure may be envisaged that have not been described above, for example, there may be any combination of renewable energy converters on the platform as described herein. As described herein, embodiments will be appreciated wherein the device does not comprise a said arm member, and in such embodiments any discussion herein relating to the arm member may apply equally to an imaginary straight line extending between the pivot point and an outer edge of the absorber distal to the pivot point. Rotation of the arm member and said imaginary line of the absorber along the rotation arc, and the device along the yaw plane, may occur at any suitable angle as described herein.

What is claimed is:

1. A wave energy capturing device arranged to capture and convert wave energy to useful energy, the device comprising:
a pivot point; and
a buoyant wave energy absorber affixed to the pivot point; wherein
the device further comprising an operating mode in which the device is arranged to capture said wave energy, wherein in the operating mode:
the pivot point is supported above a surface of a body of water and is held substantially stationary relative to wave movement in the body of water;
the buoyant absorber is positioned in engagement with said surface of the body of water at an operating location positioned downwave of the pivot point;
wherein the absorber is arranged to rotate about the pivot point under impetus from said wave movement, said rotation defining a rotation arc of the absorber along which the absorber is arranged to reciprocate in the operating mode; and
wherein the pivot point is supported at a pivot point height by at least two support arms rotationally affixed at a first end thereof proximate the pivot point, wherein a rotation of the at least two support arms about a second end thereof, distal to the first end, is arranged to adjust the pivot point height.

2. The wave energy capturing device of claim 1, wherein the absorber comprises a wave-engaging surface, and a curved downwave surface; the curved downwave surface positioned downwave of the wave-engaging surface in the operating mode; and
wherein at least a portion of the downwave surface comprises a curve extending from adjacent the wave-engaging surface substantially along a portion of the rotation arc.

3. The wave energy capturing device of claim 2, wherein the curve is concentric with, or substantially concentric with, the rotation arc.

4. The wave energy capturing device of claim 2, wherein the wave-engaging surface intersects the rotation arc.

5. The wave energy capturing device of claim 1, wherein the at least two support arms are affixed parallel to one another.

6. The wave energy capturing device of claim 1, wherein the mass of the absorber is adjustable.

7. The wave energy capturing device of claim 6, wherein the absorber comprises at least one internal compartment.

8. The wave energy capturing device of claim 7, wherein the absorber comprises a plurality of internal compartments.

9. The wave energy capturing device of claim 7, wherein the device further comprises a pump arranged to selectively displace a first fluid in said internal compartment, with a second fluid, wherein the first fluid and the second fluid comprise differing densities at room temperature.

10. The wave energy capturing device of claim 9, wherein the first fluid is air, and the second fluid is water.

11. The wave energy capturing device of claim 9, wherein said displacement is arranged to define a ratio of the first fluid and the second fluid selected from a predefined set of ratios, each said ratio associated with a corresponding property of said body of water.

12. The wave energy capturing device of claim 11, wherein the property is one or more selected from the group: a wave height; a wave frequency; a wave speed; a wave force; a wave shape.

13. The wave energy capturing device of claim 1, wherein the device further comprises:
an arm member extending from the pivot point, the arm member arranged to rotate about the pivot point; and
wherein the buoyant wave energy absorber is affixed proximate an end of the arm member distal to the pivot point.

14. The wave energy capturing device of claim 13, wherein when said surface of the body of water is substantially flat, the arm member is positioned at a rest angle relative to a vertical plane of the pivot point, the rest angle being selected from between 15° to 70°.

15. The wave energy capturing device of claim 14, wherein in the operating mode the arm member is arranged to move between a first position and a second position defining a movement angle therebetween, the movement angle being up to 90° located about the rest angle.

16. The wave energy capturing device of claim 1, wherein the device further comprises a yaw mechanism arranged to yaw the pivot point and/or the absorber on a plane perpendicular to a plane of the rotation arc.

17. The wave energy capturing device of claim 16, wherein said yawing is arranged to reposition the wave-engaging face of the absorber opposing an average or prevailing wave direction.

18. The wave energy capturing device of claim 17, wherein the yaw mechanism is further arranged to restrict said yawing following said repositioning.

19. The wave energy capturing device of claim 1, wherein the absorber comprises a width which is greater than a length or a height of the absorber, and wherein said width of the absorber in the operating mode is positioned perpendicular to an average or prevailing wave direction.

20. The wave energy capturing device of claim 1, wherein the device further comprises an energy converter arranged to convert rotation of the absorber to the useful energy.

21. The wave energy capturing device of claim 1, wherein the device further comprises a buoyant platform arranged to be tethered to a bed of said body of water, the platform being submerged in the operating mode and arranged to support the pivot point above said surface of the body of water.

22. The wave energy capturing device of claim 1, wherein the device further comprises a storm survival mode wherein the absorber is positioned above said surface of the body of water, and wherein said surface is defined by a maximum wave height of said body of water.

23. The wave energy capturing device of claim 1, wherein the device further comprises a transport mode, and wherein the absorber is positioned above said surface of the body of water, and further positioned below the pivot point in a vertical plane occupied by the pivot point.

24. A buoyant offshore renewable energy system arranged to support a wave energy capturing device as claimed in claim 1.

25. A wave energy capturing device arranged to capture and convert wave energy to useful energy, the device comprising:
a pivot point; and
a buoyant wave energy absorber affixed to the pivot point; wherein
the device further comprising an operating mode in which the device is arranged to capture said wave energy, wherein in the operating mode:

the pivot point is supported above a surface of a body of water and is held substantially stationary relative to wave movement in the body of water;

the buoyant absorber is positioned in engagement with said surface of the body of water at an operating location positioned downwave of the pivot point;

wherein the absorber is arranged to rotate about the pivot point under impetus from said wave movement, said rotation defining a rotation arc of the absorber along which the absorber is arranged to reciprocate in the operating mode;

wherein the mass of the absorber is adjustable; and wherein the absorber comprises a plurality of internal compartments.

26. A wave energy capturing device arranged to capture and convert wave energy to useful energy, the device comprising:

a pivot point;

a buoyant wave energy absorber affixed to the pivot point; and an arm member extending from the pivot point, the arm member arranged to rotate about the pivot point, wherein the buoyant wave energy absorber is affixed proximate an end of the arm member distal to the pivot point; wherein the device further comprising an operating mode in which the device is arranged to capture said wave energy, wherein in the operating mode:

the pivot point is supported above a surface of a body of water and is held substantially stationary relative to wave movement in the body of water;

the buoyant absorber is positioned in engagement with said surface of the body of water at an operating location positioned downwave of the pivot point;

wherein the absorber is arranged to rotate about the pivot point under impetus from said wave movement, said rotation defining a rotation arc of the absorber along which the absorber is arranged to reciprocate in the operating mode; and wherein when said surface of the body of water is substantially flat, the arm member is positioned at a rest angle relative to a vertical plane of the pivot point, the rest angle being selected from between 15° to 70°.

* * * * *